Sept. 10, 1968          M. A. TABET                3,401,269
           COMPOSITE COVER FOR PHOTOELECTRIC CONTROL
                UNIT AND METHOD FOR MAKING SAME
Filed June 9, 1964                              2 Sheets-Sheet 1

INVENTOR
MICHAEL A. TABET
BY
ATTORNEY

Sept. 10, 1968  M. A. TABET  3,401,269
COMPOSITE COVER FOR PHOTOELECTRIC CONTROL
UNIT AND METHOD FOR MAKING SAME
Filed June 9, 1964  2 Sheets-Sheet 2
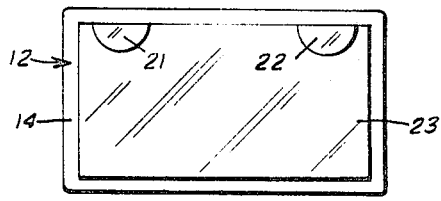
FIG.4
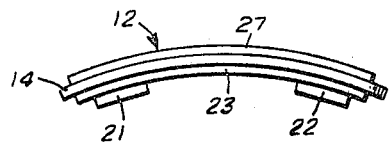
FIG.5
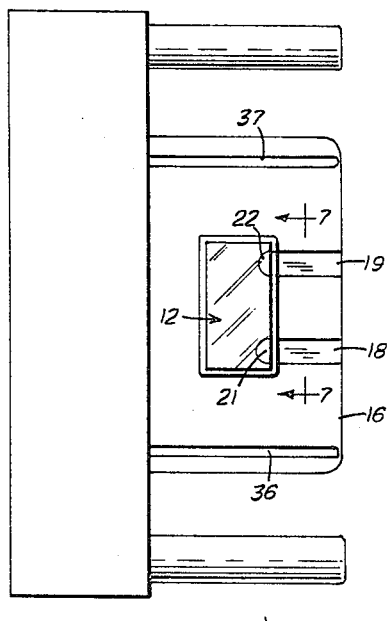
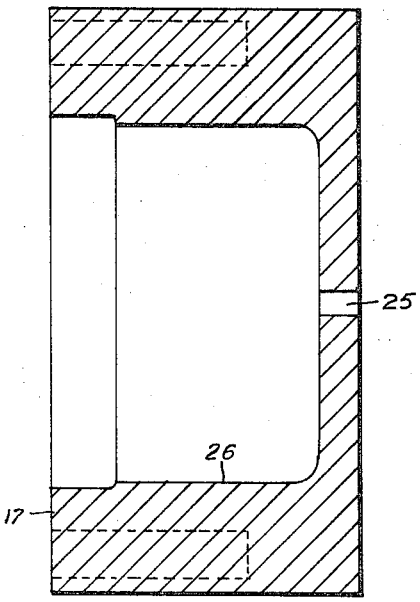
FIG.6
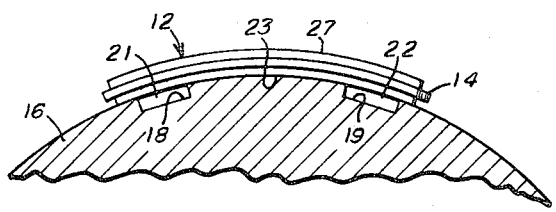
FIG.7
INVENTOR
MICHAEL A. TABET
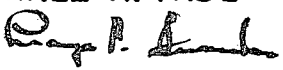
ATTORNEY United States Patent Office 3,401,269
Patented Sept. 10, 1968

3,401,269
COMPOSITE COVER FOR PHOTOELECTRIC CONTROL UNIT AND METHOD FOR MAKING SAME
Michael A. Tabet, 1336 Ballentine Blvd., Norfolk, Va. 23512
Filed June 9, 1964, Ser. No. 373,764
2 Claims. (Cl. 250—239)

ABSTRACT OF THE DISCLOSURE

A protective cover formed of opaque material for a photoelectric control unit. A relatively small light-transmissive pane spans an opening in the wall of the inverted cup-shaped cover through which light may pass to activate the photoelectric element. The pane is secured in place during molding of the cover.

---

The present invention pertains to an inverted cup-shaped member for use as a cover for a photoelectric control unit. The major portion of the cover is formed of opaque material having an opening in the generally cylindrical wall of the skirt portion to admit light to the interior of the cover. The opening is spanned by a light transmitting pane with the opaque material overlapping perimeter edges of the pane to mechanically hold the pane in position closing the opening. The invention further relates to a method of forming the light transmitting pane and molding the inverted cup-shaped member and the opaque material around in overlapping relation with edge portions of the pane. The composite inverted cup-shaped member has utility as a cover for a photoelectric control unit for a street lamp and serves to protect the control unit from inclement weather.

Such control units have been in use over a period of years which respond to the pressure of a predetermined high level of natural light to open an electric supply circuit extending to a street lamp and to close the circuit when the natural light falls below a predetermined level. Such a control unit is mounted on the lamp fixture or the standard which supports the street lamp and it is exposed to atmospheric conditions. One cover for such control units has in the past been formed of a transparent material. The photoelectric elements which are available for such control units are such that a major portion of the transparent cover was coated to prevent light rays from passing therethrough except for a small area adjacent the photoelectric element. In one prior arrangement this has been accomplished by applying an opaque paint to the interior of the transparent cover except for a small area through which natural light may pass for activating photoelectric element of the control unit. Such covers coated throughout a major portion of their inner surface with an opaque film have been in wide spread use but the job of applying the coating to prevent light from passing through a major portion of the transparent cover involves manufacturing steps and costs which are undesirable and the coating after a period of use often scales from the cover.

It is an object of the present invention to provide a cover formed of a plastic material which is opaque throughout a major portion and equipped with a pane of limited dimensions in a wall of the opaque portion through which natural light may pass to activate the photelectric element of the control unit with the composite cover serving to house and protect the electrical components of the unit.

A further object of the invention is to provide a cover formed of an opaque composition wherein a light transmitting pane is molded in a wall portion of the opaque composition with the perimeter of the pane sealed with respect to the opaque portion of the cover to thereby provide a weatherproof housing for encasing an electric control unit whereby natural light may pass through a limited area of the cover into the presence of a photoelectric element which forms a part of the control unit.

A further object of the invention is to provide a method of molding a composite cover having a generally cup shape wherein plastic material is molded about a light transmitting pane in such a manner that the outer surface of the pane is flush with the outer surface of the opaque cover and to provide a composite cover wherein the perimeter of the pane is sealed with respect to adjoining portions of the cover.

Other objects and features of the invention will be appreciated and become apparent to those skilled in the art to which the invention pertains as the present disclosure proceeds and upon consideration of the following detailed description taken in conjunction with the accompanying drawings wherein an embodiment of the invention and a method of carrying out the invention is disclosed.

In the drawings:

FIG. 4 is an enlarged elevational view of a light transmitting pane for spanning an aperture in the opaque portion of the cover.

FIG. 5 is a plan view of the pane shown in FIG. 4.

FIG. 6 in the left hand portion is a plan view of a male part of the mold for shaping the opaque portion of the cover while the structure shown at the right is a sectional plan view of a female portion of the mold.

FIG. 7 is an enlarged fragmentary sectional view of the male part of the mold showing the manner in which the pane is held in position during molding of the opaque portion of the cover.

Figure 1:
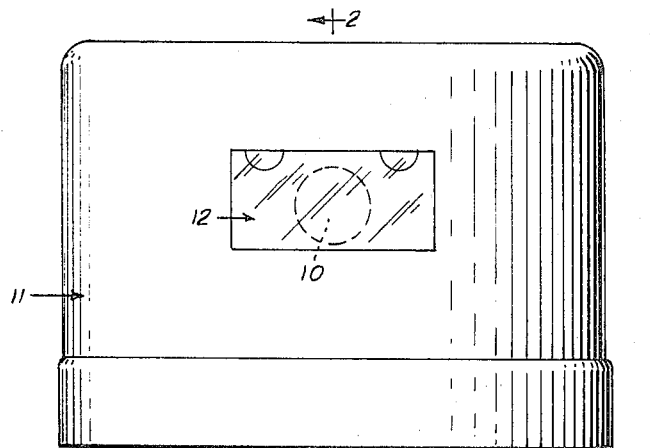
FIG. 1 is an elevational view of a cover for a light control unit embodying the invention.

A unit which includes a photoelectric element for controlling the energization and the deenergization of a load such as a street lamp in response to the absence and the presence of natural light falling on the photoelectric element is in use and the electrical elements and supports therefor are encased within a cover and the photoelectric element is diagrammatically indicated at 10 in FIG. 1. The cover is desirably of inverted cup-shape and fits over the electrical components of the unit and prongs 9 depending therefrom are adapted to be inserted in an electric socket carried by the lamp fixture or the standard for a street lamp. The cover thus serves as a protective housing shielding the electrical components from rain and other weather conditions.

Figure 2:
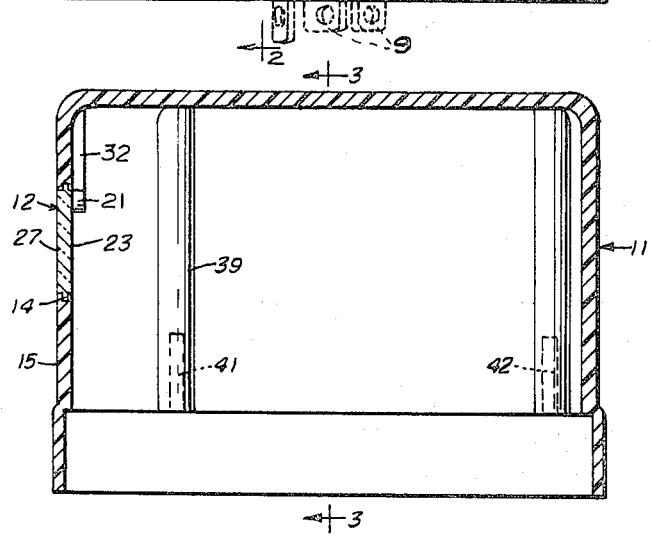
FIG. 2 is a sectional view taken on the line 2—2 of FIG. 1.

A cover exhibiting the invention as indicated at 11 is formed of an opaque thermoplastic molding composition throughout its major portion with a light transmitting pane 12 formed in the skirt or cylindrical wall of the cup-shaped cover. In carrying out the present invention the pane 12 is first formed as a separate element and the pane may be made in a molding operation. The pane 12 is formed to have an arcuate shape as shown in FIG. 5 and of a curvature which corresponds with that of the circumference of the skirt of the cup-shaped cover 11. The pane 12 when formed of transparent composition is desirably of rectangular shape when viewed from its face as shown in FIGS. 1 and 4. The pane 12 carries a flange 14 throughout the perimeter thereof and this flange has a thickness less than that of the pane 12. The thickness of the pane 12 itself is desirably the same as the thickness of the wall or skirt portion 15 of the cover 11 as shown in FIG. 2. Two small lugs 21 and 22 are formed on the pane 12 in positions as shown in FIGS. 4 and 5. These lugs are desirably formed integral with and project from the inner face 23 of the pane 12.

The manufacture of the composite cover may be carried out in an injection molding operation. In one machine for molding an opaque composition to provide the major portion of the composite cover with the light transmitting pane 12 in a sealed relationship in the wall or skirt portion 15 includes a male part 16 and a female part 17. The male part 16 is provided with two grooves 18 and 19 in the upper portion of the generally cylindrical shaped mold part 16. The lugs 21 and 22 are spaced from each other to fit within the grooves 18 and 19. The inner face 23 of the pane 12 lies along the convex arcuate surface of the male part 16. With the pane 12 in such a position as shown at the left in FIG. 6 the mold parts are closed. The substantial cylindrical inner surface 26 of the female part 17 of the die has such a diameter as to fit over the exterior surface 27 of the pane 12 with a minimum of clearance and without scoring or abrading the outer face of the pane. The lugs 21 and 22 fit within the grooves 18 and 19 and maintain the pane 12 in the desired circumferential position on the mold part 16. The arcuate ends of the lugs 21 and 22 abut shoulders at the inner ends of the grooves 18 and 19 and this structure prevents axial movement of the pane 12 relative to the mold part 12 when the mold parts are closed.

Figure 3:
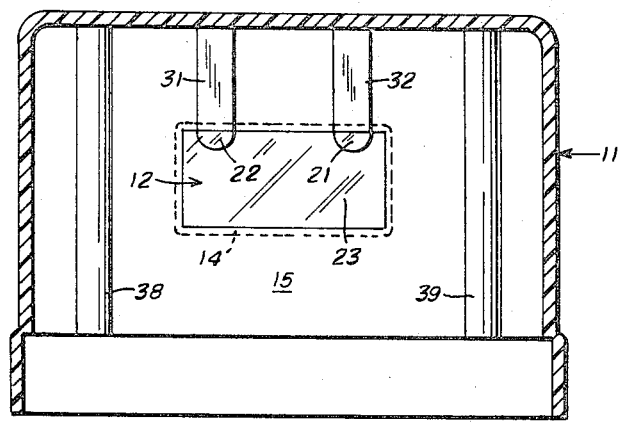
FIG. 3 is a sectional view taken on the line 3—3 of FIG. 2.

After the mold is closed the opaque plastic composition is injected under pressure through suitable nozzle fitting within the opening 25. The preheated opaque composition flows about the male part 16 and about the perimeter of the pane 12 and about the flange 14 of the pane within the space formed between the exterior of the male part and the interior of the female part 17. The opaque plastic material thus arranges itself about the perimeter of the pane 12 and encases the flange 14 as shown in FIG. 2. The flange 14 is covered on its inner and outer faces with opaque material as will be apparent from a consideration of FIGS. 2 and 3. The heated opaque plastic composition does not flow over the outer face 27 nor over the inner face 23 because these faces lie along the inner and outer faces of the mold parts. The physical characteristics of the pane 12 are not altered during the molding of the major portion of the cover 11 because of the low temperature of the mold parts and the pane 12 which is thus sealed in the side wall of the cover 11. The grooves 18 and 19 formed in the mold part 16 which receive the lugs 21 and 22 and hold the pane 12 in position while the mold parts are closed and during the injection of the plastic material under pressure form ribs 31 and 32 along the inner surface of the opaque portion of the cover 11 but draft characteristics are provided by the grooves 18 and 19 for removing the molded cover. These ribs serve to reinforce the cover. Grooves 36 and 37 in the mold part 16 from ribs 38 and 39 along the inner surface of the cover which provide enlargements for receiving cap screws in the portions indicated at 41 and 42 in FIG. 2 to hold the cover in operative association with the control unit.

The method of manufacturing the composite cover 11 results in a housing for encasing the electrical elements of the control unit which is opaque throughout its major portion. The light transmitting pane 12 may be formed of transparent plastic composition or glass or a translucent composition. The perimeter of the pane 12 is sealed with respect to the major portion of the cover 11. The pane 12 allows a limited amount of the natural light to pass therethrough and into the presence of the photoelectric element. The cover and the pane provide an impervious housing shielding the electrical components and other structural elements from the weather.

In carrying out the invention various types of thermoplastic molding compositions may be employed. In one embodiment an opaque "Tenite Butyrate" is employed in forming the major portion of the cover 11. The light transmitting pane 12 may be formed of a thermoplastic molding composition such as "Tenite Butyrate" which is clear and transparent. Such molding compositions are marketed by Eastman Chemical Products, Inc. Other thermoplastic molding compositions may be employed such as acrylic resins manufactured and marketed by E. I. du Pont de Nemours & Company, Inc., under the trademark "Lucite." Such acrylic resin plastic compositions have opaque characteristics for the major portion of the cover 11 and clear or translucent light transmitting characteristics for the pane 12.

While the invention has been described with regard to one type of cover it will be appreciated that the structure of the housing may be varied and the shape of the pane may be altered. Such changes and other modifications may be made in the cover along with the steps of carrying out the method of making the composite housing without departing from the scope of the invention as set forth in the appended claims.

What I claim and desire to secure by Letters Patent is:

1. A composite cover for an electrical control unit which includes a photoelectric element comprising, an inverted generally cup-shaped member formed of opaque material having a substantially cylindrical wall forming a skirt portion with an opening therethrough, a pane formed of light transmitting material, said pane being shaped as a cylindrical segment having a curvature corresponding substantially to that of said wall with its perimeter along the boundary of said opening, said pane having a thickness substantially equal to the thickness of said wall with the outer face of the pane substantially flush with the exterior surface of said wall, a flange extending from edges of said pane, said flange being of less thickness than said pane with an outer face of the flange positioned inwardly of the exterior surface of said wall and an inner face of the flange positioned outwardly of the inner surface of said wall, and said opaque wall surrounding said opening overlapping the inner and outer faces of said flange.

2. A method of making a composite cup-shaped cover for a photoelectric control unit which comprises, shaping a pane from material having light transmitting characteristics with lugs on an inner face adjacent one edge thereof, arranging said pane on a male mold element having a substantially cylindrical shape to form the interior of the cup-shaped cover with said lugs within grooves in the male element and in abutting relation with shoulders at ends of said grooves, arranging a female mold element over said male element with the inner surface of the female element overlying the exposed face of said pane, applying plastic opaque material between said mold elements in the direction of said shoulders to form an opaque cup-shaped member with the pane in a skirt portion and with the opaque material disposed about the perimeter of said pane.

References Cited
UNITED STATES PATENTS

| 1,764,368 | 6/1930 | Thomas | 250—239 |
| 2,756,349 | 7/1956 | Frank | 215—1 X |
| 2,978,591 | 4/1961 | Ringger | 250—239 |
| 3,031,582 | 4/1962 | Benner et al. | 250—239 |

RALPH G. NILSON, *Primary Examiner.*

M. A. LEAVITT, *Assistant Examiner.*